United States Patent
Suzuki et al.

(10) Patent No.: US 8,961,839 B2
(45) Date of Patent: Feb. 24, 2015

(54) PRODUCTION METHOD OF OPTICAL WAVEGUIDE

(75) Inventors: Toshihiko Suzuki, Kanagawa (JP); Keishi Shimizu, Kanagawa (JP); Kazutoshi Yatsuda, Kanagawa (JP); Shigemi Ohtsu, Kanagawa (JP); Akira Fujii, Kanagawa (JP); Eiichi Akutsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1294 days.

(21) Appl. No.: 12/048,352

(22) Filed: Mar. 14, 2008

(65) Prior Publication Data

US 2008/0289366 A1    Nov. 27, 2008

(30) Foreign Application Priority Data

May 25, 2007    (JP) ................ 2007-139244

(51) Int. Cl.
B29D 11/00    (2006.01)

(52) U.S. Cl.
USPC ......... 264/1.24; 264/1.27; 264/1.38; 264/2.7; 264/139

(58) Field of Classification Search
USPC ........ 264/1.1, 1.24, 1.27, 1.36, 1.38, 2.7, 139
See application file for complete search history.

(56) References Cited

U.S. PATENT DOCUMENTS

| 5,082,347 | A | 1/1992 | Akasaka et al. |
| 6,549,685 | B2 | 4/2003 | Marks et al. |
| 6,929,760 | B2 | 8/2005 | Shimizu et al. |
| 7,373,066 | B2 | 5/2008 | Ishikawa et al. |
| 7,620,285 | B2 * | 11/2009 | Suzuki et al. ................ 385/132 |
| 2004/0026803 | A1 | 2/2004 | Yatsuda et al. |
| 2004/0218851 | A1 | 11/2004 | Izumitani et al. |
| 2006/0091571 | A1 * | 5/2006 | Akutsu et al. ................ 264/1.24 |
| 2007/0114684 | A1 * | 5/2007 | Ohtsu et al. ................ 264/1.24 |
| 2008/0282741 | A1 * | 11/2008 | Shimizu et al. ................ 65/386 |
| 2009/0053414 | A1 | 2/2009 | Fujioka et al. |
| 2009/0142026 | A1 | 6/2009 | Shioda |
| 2009/0315961 | A1 | 12/2009 | Fujioka et al. |

FOREIGN PATENT DOCUMENTS

JP    8-286064 A    11/1996

(Continued)

OTHER PUBLICATIONS

Non-Final Office Action dated Oct. 4, 2010 in U.S. Appl. No. 12/045,751.

(Continued)

Primary Examiner — Mathieu D. Vargot
(74) Attorney, Agent, or Firm — Sughrue Mion, PLLC

(57) ABSTRACT

A production method of an optical waveguide includes: preparing a laminated body that includes a first clad layer and at least a core layer laminated on the first clad layer; forming a light propagating optical waveguide core by cutting the core layer by use of a dicing saw from a side where the core layer is laminated while intruding an edge of a blade portion of the dicing saw into the first clad layer so as to partially cut the first clad layer; and embedding at least a cut portion of the laminated body with a second clad layer.

11 Claims, 4 Drawing Sheets

(56) References Cited

FOREIGN PATENT DOCUMENTS

| | | |
|---|---|---|
| JP | 09222524 A | 8/1997 |
| JP | 09230155 A | 9/1997 |
| JP | 2004069742 A | 3/2004 |
| JP | 2004177730 A | 6/2004 |
| JP | 2007016225 A | 1/2007 |
| WO | WO 2007004575 A1 | 1/2007 |

OTHER PUBLICATIONS

Final Office Action dated Mar. 18, 2011 in U.S. Appl. No. 12/045,751.
Japanese Patent Office Action dated Sep. 27, 2011 and English-language translation thereof.
Non-Final Office Action dated Dec. 20, 2011 in U.S. Appl. No. 11/472,456.

* cited by examiner

PRODUCTION METHOD OF OPTICAL WAVEGUIDE

CROSS-REFERENCE TO RELATED APPLICATIONS

This application is based on and claims priority under 35 USC 119 from Japanese Patent Application No. 2007-139244 filed May 25, 2007.

BACKGROUND

1. Technical Field

The present invention relates to a production method of an optical waveguide.

2. Related Art

As an example of a mode when a polymer optical waveguide is applied to intra-device and inter-device optical interconnections, there is a multimode optical waveguide having a simple structure where linear cores are arranged at a desired pitch.

SUMMARY

According to an aspect of the invention, there is provided a production method of an optical waveguide, including: preparing a laminated body that includes a first clad layer and at least a core layer laminated on the first clad layer; forming a light propagating optical waveguide core by cutting the core layer by use of a dicing saw from a side where the core layer is laminated while intruding an edge of a blade portion of the dicing saw into the first clad layer so as to partially cut the first clad layer; and embedding at least a cut portion of the laminated body with a material of a second clad layer.

BRIEF DESCRIPTION OF THE DRAWINGS

Exemplary embodiments of the present invention will be described in detail based on the following figures, wherein.

DETAILED DESCRIPTION

Figure 1A:
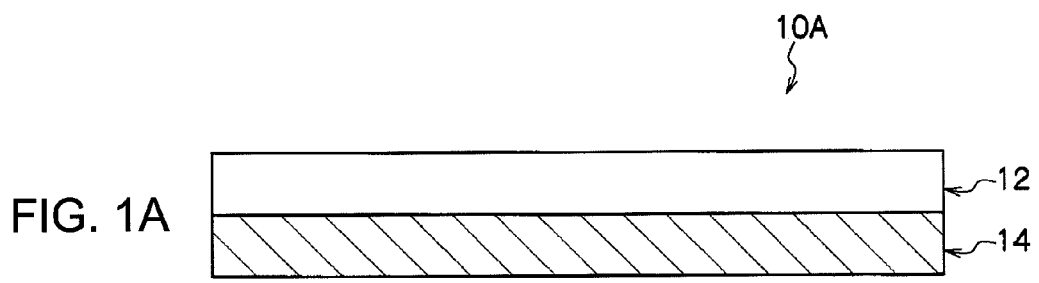
FIGS. 1A to 1C are process charts showing a production method of an optical waveguide film according to a first exemplary embodiment.

In what follows, the present invention will be detailed with reference to the drawings. Members having substantially same function and action are provided with same reference numerals in all drawings and, in some cases, duplicated descriptions may be omitted.

First Exemplary Embodiment

Figure 1B:
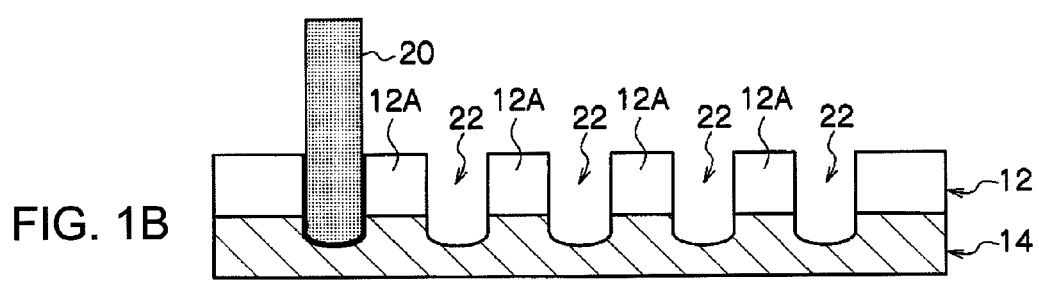
Figure 1C:
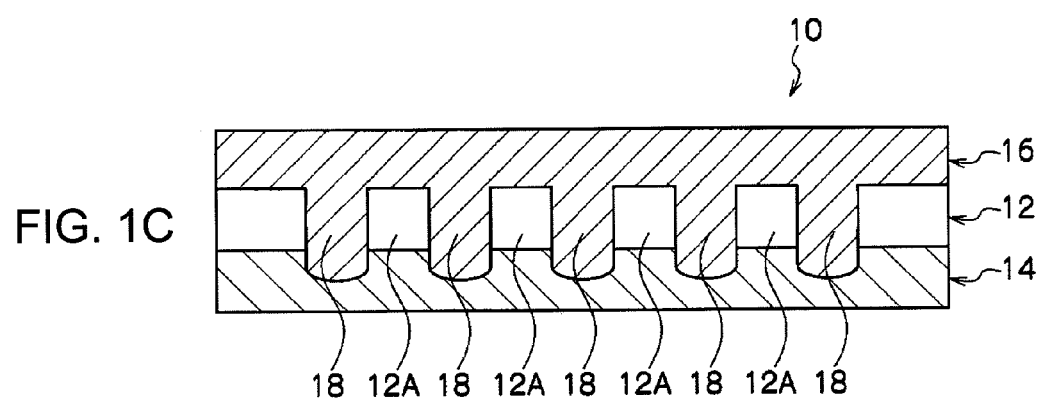

FIGS. 1A to 1C are process charts showing a production method of an optical waveguide film according to a first exemplary embodiment.

In a production method of an optical waveguide film according to a first exemplary embodiment, in the beginning, as shown in FIG. 1A, a polymer film 10A (laminated body) where a clad layer and a core layer are laminated is prepared.

In a polymer film 10A, a lower clad layer 14 (first clad layer) and a core layer 12 are laminated in this order. The polymer film 10A may be prepared by laminating sheets corresponding to the respective layers by a method such as a lamination method. The preparation thereof, since there is no need to align the respective sheets, is convenient and low in cost.

The polymer film 10A, as far as it is made of materials that may provide refractive index difference between the clad layer and the core layer, is not particularly restricted. For instance, an alicyclic olefin film, an acrylic film, an epoxy film or a polyimide film may be used.

In the next place, as shown in FIG. 1B, by use of a dicing saw 20, the polymer film 10A is cut from a core layer 12 side to form optical waveguide core 12A. The optical waveguide core 12A may be formed when, by use of a dicing saw, a cutting operation where the polymer film 10A is cut along a length direction is applied at a predetermined interval (the interval becomes a width of an optical waveguide core 12A) in a width direction of the polymer film 10A. That is, the polymer film 10A is cut so that cut grooves 22 (cut portions) extending along a length direction of the polymer film 10A may be formed in parallel with a predetermined interval in a film width direction.

A region of the core layer 12, which is formed by cutting and is sandwiched between cut grooves 22, becomes an optical waveguide core 12A. Accordingly, owing to the cutting, a plurality of optical waveguide cores 12A are formed so as to be arranged in parallel on the same plane of a lower clad layer 14 so that propagating lights may proceed in parallel with each other in a width direction of the polymer film 10A.

When the dicing saw 20 is used to cut the core layer 12 to form the optical waveguide cores, that is, when the dicing saw 20 is used to form cut grooves 22 in the core layer 12, a edge of a blade portion of the dicing saw 20 is allowed to reach a lower clad layer 14 and to intrude therein by a predetermined depth to partially cut the clad layer 14. In other words, cutting is performed so that an edge of a blade portion of the dicing saw 20 incises the lower clad layer 14 to form cut grooves 22.

In the next place, as shown in FIG. 1C, in the cut grooves 22 formed in the polymer film 10A, a clad layer forming curable resin is filled and cured to form an embedded clad layer 18. Furthermore, in the exemplary embodiment, the clad layer forming curable resin is, when filled in the cut grooves 22, simultaneously, coated on a surface (exposed surface) of the core layer 12 (optical waveguide core 12A) located as the uppermost layer (layer located on a side opposite to the first clad layer in a film thickness direction) of the polymer film 10A to form an upper clad layer 16. In the exemplary embodiment, the embedded clad layer 18 and the upper clad layer 16 correspond to the second clad layer.

Here, a curable resin for forming the embedded clad layer 18 and upper clad layer 16 is a liquid material and, for instance, a radiation-curable, electron beam-curable or thermosetting resin may be used. Specifically, as the curable resin, a UV-curable resin and thermosetting resin may be used, and, more specifically, a UV-curable resin may be selected. As the UV-curable resin or thermosetting resin, UV-curable or thermosetting monomer, oligomer or a mixture of monomer and oligomer may be used. As the UV-curable resin, an epoxy, polyimide or acrylic UV-curable resin may be used.

The lower clad layer 14, upper clad layer 16 and embedded clad layer 18 are constituted of materials lower in refractive index than the core 12A. In particular, in order to secure the refractive index difference from the optical waveguide core 12A, the relative refractive index difference may be 0.5% or more, and specifically, may be 1% or more. Furthermore, the refractive index difference between the respective clad layers, in view of confinement of light, may be small such as 0.05 or less, specifically 0.001 or less and more specifically zero.

Thus, the optical waveguide film 10 is prepared. The obtained optical waveguide film 10 may have a thickness of 50 μm to 500 μm and specifically 100 μm to 200 μm. On the other hand, the optical waveguide film 10 may have a width of 0.5 mm to 10 mm and specifically 1 mm to 5 mm. When the thickness and width of the optical waveguide film 10 are set in the above-mentioned ranges, flexibility may be secured and strength may be readily obtained.

In the optical waveguide film 10 according to the above-described exemplary embodiment, since the core layer 12 and a part of the lower clad layer 14 are simultaneously cut and removed by use of the dicing saw 20 so as to intrude an edge of a blade portion of the dicing saw 20 into the lower clad layer 14, optical waveguide cores 12A having an excellent cross-sectional shape may be formed. Accordingly, deformation and fluctuation of the cross-sectional shapes of the formed optical waveguide cores 12A may be suppressed to provide a production method excellent in mass productivity.

So far, when the cut grooves 22 are formed in the core layer 12 by use of the dicing saw 20, a cross-sectional shape of the cut groove 22 has been presumed to be always substantially a rectangle. However, a cross-sectional shape of the cut groove 22, as the edge of a blade portion of the dicing saw 20 is worn, is rounded; as a result, the planarity of a bottom surface of the cut groove 22 is deteriorated.

Figure 2:
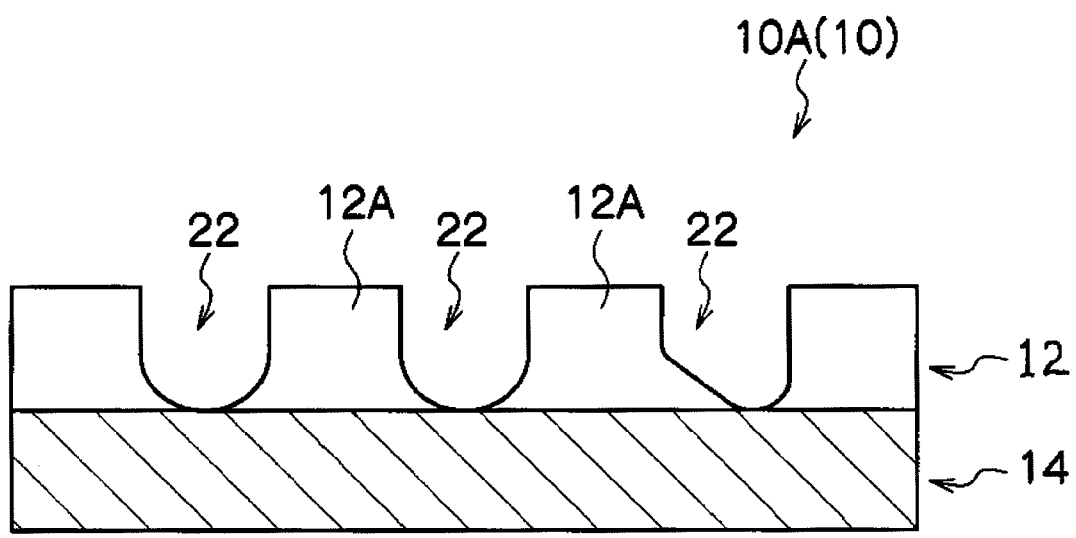
FIG. 2 is a schematic cross-sectional view showing an example of a defective shape of an optical waveguide core, which is caused when a cross-sectional shape of a cut groove formed in a core layer is deviated from a rectangle in an optical waveguide film.

Specifically, as shown in, for instance, FIG. 2, when a cross-sectional shape of the cut groove 22 is deformed (worn) from a rectangle at the time of start of use of the dicing saw 20 due to wear of the edge of the blade portion of the dicing saw 20, a cross-section of the formed optical waveguide core 12A is also deformed from a rectangle. Furthermore, in comparison with an ideal rectangular case, a cross-sectional area of the optical waveguide core 12A increases. A core diameter of the optical waveguide core 12A is determined considering efficiency of optical connection with a receiving or emitting element or an optical fiber connected to the optical waveguide film 10. When a cross-sectional area of the optical waveguide core 12A is increased due to shape abnormality of the optical waveguide core 12A, an increase in the connection loss is caused. Furthermore, when a cross-section of the optical waveguide core 12A is excessively deviated from a rectangle, excellent confinement of light may not be obtained. In particular, in an optical waveguide film 10 having high flexibility (flexible optical waveguide), there is a fear in that increase in the loss may be caused at the time of bending.

FIG. 2 is a schematic sectional view showing an example of a defective shape of an optical waveguide core 12A, which is caused when a cross-sectional shape of a cut groove 22 formed in a core layer 12 is deviated from a rectangle in an optical waveguide film.

Figure 3:
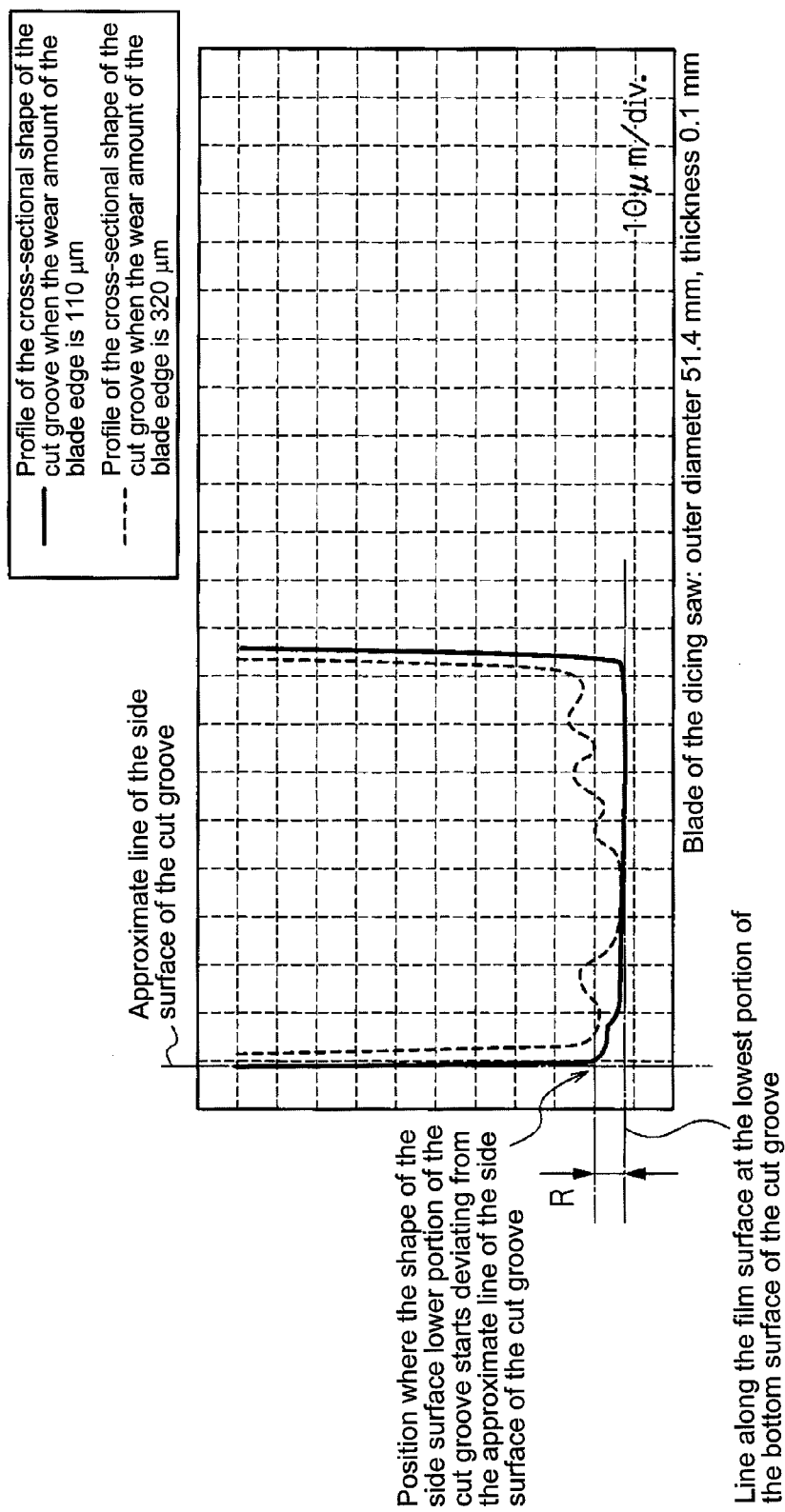
FIG. 3 is a conceptual diagram showing an example of variation of a profile of a cross-sectional shape of a cut groove based on a wear amount (decrease amount of radius) of a dicing saw 20.

On the other hand, in FIG. 3, an example of variation of a profile of a cross-sectional shape of a cut groove 22 based on a wear amount (decrease amount of radius) of a dicing saw 20 having a blade portion having an outer diameter of 51.4 mm and a thickness of 0.1 mm is shown. A solid line shows a profile of a cross-sectional shape of a cut groove when a wear amount of a blade portion is 110 μm, and a dotted line shows a profile of a cross-sectional shape when the wear amount of the blade portion is 320 μm. Furthermore, a dashed-dotted line shows a side surface approximate line of the cut groove 22 and a line along a film surface at the lowest portion of a bottom surface of the cut groove 22.

Then, as shown in FIG. 3, a position where a shape of a side surface lower portion of the cut groove 22 (brim of the bottom portion) starts deviating from an approximate line of a side surface of the cut groove 22, as the wear amount of the edge of the blade portion of the dicing saw increases, becomes higher from the lowest portion of a bottom surface of the cut groove 22. Here, in FIG. 3, a length (height) in a groove depth direction between a position where a shape of a side surface lower portion (brim of bottom portion) of the cut groove 22 starts deviating from an approximate line of a side surface of the cut groove 22 and the lowest portion of a bottom surface of the cut groove 22 is shown by "R".

Accordingly, when an edge of a blade portion of a dicing saw 20 is allowed to incise a lower clad layer 14, that is, when an edge of a blade portion of the dicing saw 20 is allowed to incise a lower clad layer 14 by a predetermined depth to partially cut the layer, a deformation portion of a cross-sectional shape of a cut groove 22 (portion where the planarity of a bottom surface is deteriorated) due to the wear of the edge of the blade portion of the dicing saw 20 is formed in the lower clad layer 14 and, thereby, a cross-sectional shape of the cut groove 22 in the core layer 12 is inhibited from deforming or fluctuating. As a result, a cross-sectional shape of the formed optical waveguide core 12A is inhibited from deforming or fluctuating; accordingly, a production method excellent in mass productivity is obtained.

On the other hand, a position where a shape of a side surface lower portion of the cut groove 22 (brim of a bottom portion) starts deviating from an approximate line of a side surface of the cut groove 22 (a length R in a groove depth direction between a position where a shape of a side surface lower portion of the cut groove 22 starts deviating from an approximate line of a side surface of the cut groove 22 and the lowest portion of a bottom surface of the cut groove 22) is about 5 μm in a brand-new blade. Accordingly, an incising amount of the edge of the blade portion of the dicing saw 20 into the lower clad layer 14 may be set at 5 μm or more (specifically 10 μm or more). Thereby, an optical waveguide core 12A having an excellent cross-sectional shape may be obtained.

Furthermore, in the case where a distance (cutting residue amount) between a bottom surface of a cut groove 22 and a surface of a lower clad layer 14 (surface on a side opposite to a cutting side) is small, in some cases, there occurs a production trouble where, owing to external force applied to a polymer film 10A at the time of cutting, the lower clad layer 14 is completely cut through. Accordingly, the cutting residue amount may be set at 5 μm or more (specifically 10 μm or more). Thereby, a polymer film 10A is inhibited from being damaged when an optical waveguide core 12A is formed.

Furthermore, when a prepared optical waveguide film 10 is imparted with flexibility, in order to obtain an optical waveguide film 10 thin in a total thickness, a lower clad layer 14 and an upper clad layer 16 are necessarily made thinner. However, in considering restrictions on the incising amount and the cutting residue amount and the cutting accuracy in a film thickness direction of the dicing saw, the lower clad layer 14 may be set at a thickness of 20 μm or more (specifically 30 μm to 150 μm). Accordingly, for decreasing the total thickness of the optical waveguide film 10, it is effective to vary the thicknesses of the lower clad layer 14 and the upper clad layer 16 covering the optical waveguide core 12A on a side opposite in a thickness direction to the lower clad layer 14 so that the thickness of the lower clad layer 14 is 20 μm or more and the thickness of the upper clad layer 16 is thinner than that of the lower clad layer 14.

Second Exemplary Embodiment

Figure 4A:
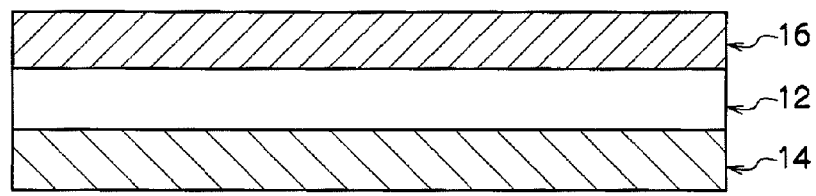
FIGS. 4A to 4C are process charts showing a production method of an optical waveguide film according to a second exemplary embodiment.
Figure 4B:
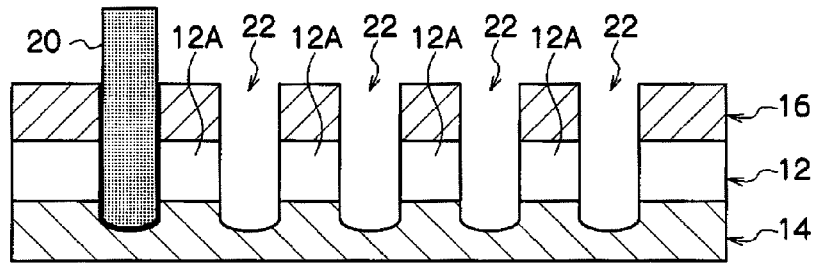
Figure 4C:
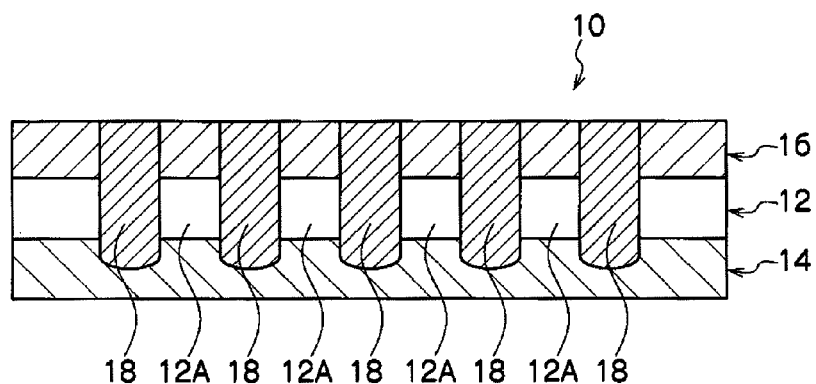

FIGS. 4A to 4C are process charts showing a production method of an optical waveguide film according to a second exemplary embodiment.

In a production method of an optical waveguide film 10 according to the second exemplary embodiment, in the beginning, as shown in FIG. 4A, a clad layer and a core layer are laminated to prepare a polymer film 10A (laminated body).

In a polymer film 10A, a lower clad layer 14, a core layer 12 and an upper clad layer 16 are laminated in this order.

In the next place, as shown in FIG. 4B, the dicing saw 20 is used to cut the polymer film 10A from a core layer 12 and upper clad layer 16 formation side, that is, to cut the core layer 12 and upper clad layer 16 to form an optical waveguide core 12A.

A region of the core layer 12 interposed between the cut grooves 22 formed by the cutting becomes an optical waveguide core 12A. Accordingly, due to the cutting, a plurality of optical waveguide cores 12A are formed so as to be arranged in parallel on the same plane of a lower clad layer 14 so that propagating lights may proceed in parallel with each other in a width direction of the polymer film 10A.

When the dicing saw 20 is used to cut the core layer 12 to form the optical waveguide cores, namely, when the dicing saw 20 is used to form the cut grooves 22 in the core layer 12, the edge of the blade portion of the dicing saw 20 is allowed to reach the lower clad layer 14 and to intrude therein by a predetermined depth to partially cut the lower clad layer 14. In other words, cutting is performed so that the edge of the blade portion of the dicing saw 20 incises the lower clad layer 14 to form the cut grooves 22.

Then, as shown in FIG. 4C, into the cut grooves 22 formed in the polymer film 10A, a clad layer forming curable resin is filled and cured to form embedded clad layers 18. In the exemplary embodiment, the embedded clad layer 18 corresponds to a second clad layer and the upper clad layer corresponds to a third clad layer.

Thus, the optical waveguide film 10 is prepared. Others than the above are same as the first exemplary embodiment; accordingly, descriptions thereof will be omitted.

In the production method of the optical waveguide film according to the above-described exemplary embodiment, since the dicing saw 20 is used to simultaneously cut the core layer 12 and upper clad layer 16 and a part of the lower clad layer 14 so as to intrude the edge of the blade portion of the dicing saw 20 into the lower clad layer 14, an optical waveguide core 12A having an excellent cross-sectional shape is formed. As a result, a production method where the cross-sectional shapes of the formed optical waveguide cores 12A are inhibited from deforming and fluctuating and the mass productivity is excellent is obtained.

Furthermore, since a three-layered polymer film 10A where top and bottom surfaces of the core layer 12 are protected by a lower clad layer 14 and an upper clad layer 16 is used, the optical waveguide core 12A is inhibited from being damaged in the steps of dicing and forming an embedded clad; accordingly, the light guiding properties of products may be inhibited from fluctuating, whereby defect rate may be decreased.

Thus, the method in which the polymer film 10A where the lower clad layer 14, the core layer 12, and the upper clad layer 16 are sequentially laminated is cut as described above is also a production method where the cross-sectional shapes of the formed optical waveguide cores 12A are inhibited from deforming and fluctuating and the mass productivity is excellent. In the exemplary embodiment, a mode where two layers of the core layer 12 and upper clad layer 16 are laminated on the lower clad layer 14 is described. However, without restricting thereto, a mode where a polymer film obtained by alternately laminating pluralities of core layers and clad layers on the lower clad layer 14 is cut may be adopted.

EXAMPLES

In what follows, the present invention will be specifically described with reference to examples. However, the examples do not restrict the invention.

Example 1

According to a production method of an optical waveguide film according to the first exemplary embodiment, an optical waveguide film is produced as follows.

A two-layered polymer film where, on ARTON FILM (trade name, manufactured by JSR Corporation, refractive index: 1.51) having a length of 145 mm, a width of 30 mm and a thickness of 100 μm, an acrylic resin layer (refractive index: 1.57) having a thickness of 45 μm is formed is prepared.

In the next place, a dicing saw equipped with a blade having a thickness of 120 μm is used to cut the acrylic resin layer so that the cutting depth position is 80 μm from the lowermost surface of the two-layered polymer film and optical waveguide cores having a width of 45 μm is arranged at a pitch of 250 μm in a width direction of the polymer film to form cut grooves. At this time, a blade portion of the dicing saw intrudes in the ARTON FILM to cut the ARTON FILM at the maximum cut groove depth (incising depth) of 20 μm. Thus, optical waveguide cores are formed.

Then, an acrylic UV-curable resin (refractive index: 1.51) is coated at a thickness of 50 μm so as to fill the cut grooves formed in the acrylic resin layer and to cover the acrylic resin layer, that is, to cover the optical waveguide cores, and is cured by UV-ray exposure.

Subsequently, a dicing saw is used to form an external shape to prepare a four-channel optical waveguide film having a length of 140 mm and a width of 0.9 mm.

A cross-sectional shape of the optical waveguide core of the prepared optical waveguide film is a rectangle that has a height of 45 μm and a width of 45±2 μm.

Then, at one end of the optical waveguide film, a graded-index type multimode optical fiber (GI-MMF) having a core diameter of 50 μm is connected, followed by inputting LED (light-emitting diode) light having a wavelength of 850 nm. To the other end of the optical waveguide film, a hard polymer clad optical fiber (HPCF) having a core diameter of 200 μm is connected, and an incident position of the GI-MMF is adjusted so that light intensity guided from the HPCF to a photometer may be the maximum. Then, the HPCF is changed to a GI-MMF having a core diameter of 50 μm to compare the light intensity with that in the case of the HPCF, and thereby, the connection loss when light is input from the optical waveguide film to the GI-MMF having a core diameter of 50 μm is determined. An average value of the connection loss of four optical waveguide cores is 2.5 dB.

Example 2

According to a production method of an optical waveguide film according to the second exemplary embodiment, an optical waveguide film is prepared as follows.

A three-layered polymer film having a length of 125 mm and a width of 30 mm, in which both surfaces of an epoxy resin layer (core layer: refractive index, 1.60) having a thickness of 50 µm are covered with epoxy resin (clad layers: refractive index, 1.55) having thicknesses of 10 µm and 25 µm, is prepared.

In the next place, with the epoxy resin layer having a thickness of 25 µm as a disposition surface (lower surface), the polymer film is mounted on a dicing saw, and, by use of a dicing saw equipped with a blade having a thickness of 120 µm, the epoxy resin layer having a thickness of 50 µm is cut from a side of an epoxy resin layer having a thickness of 10 µm so that a position at 10 µm from the lowermost surface (disposition surface) of the polymer film may be a cutting depth and optical waveguide cores having a width of 50 µm may be arranged at a pitch of 500 µm in a width direction of the polymer film to form cut grooves. At this time, a blade portion of the dicing saw intrudes into the epoxy resin layer having a thickness of 25 µm so that a cut groove depth (incising amount) in the epoxy resin layer may be 15 µm at the maximum. Thus, optical waveguide cores are formed.

Then, an epoxy UV-curable resin (refractive index: 1.55) is coated so as to be embedded in the cut grooves formed in the epoxy resin layer, namely, so as to cover the optical waveguide cores, followed by exposing UV-ray for curing.

Subsequently, a dicing saw is used to form an external shape to prepare a two-channel optical waveguide film having a length of 120 mm and a width of 0.9 mm.

Cross-sectional shapes of the optical waveguide cores of the prepared optical waveguide film are rectangles that have a height of 50 µm and a width of 50±2 µm. Similarly to example 1, the connection loss when light is input from the optical waveguide film to the GI-MMF having a core diameter of 50 µm is determined and an average value of two optical waveguide cores is 5.1 dB.

Comparative Example 1

Except that a dicing saw equipped with a blade having a thickness of 120 µm is used to form cut grooves, namely, optical waveguide cores, so that a position located at 25 µm from the lowermost surface (disposition surface) of a polymer film may be a cutting depth, similarly to example 2, a two-channel optical waveguide film having a length of 120 mm and a width of 0.9 mm is prepared. When the dicing saw is used for cutting, the epoxy resin layer having a thickness of 25 µm is not cut.

While a cross-sectional shape of the optical waveguide cores of the prepared optical waveguide film is a rectangle that has a height of 50 µm and a width of 50 µm, in proximity to the epoxy resin layer (lower clad layer) having a thickness of 25 µm, both side surfaces extend outside and the sectional area is 30% larger than that of example 2. Furthermore, when, similarly to example 1, the connection loss when light is input from the optical waveguide to the GI-MMF having a core diameter of 50 µm is determined, an average value of two waveguide cores is 8.5 dB, which is an inferior result.

What is claimed is:

1. A production method of an optical waveguide, comprising:
    preparing a laminated body that comprises a first clad layer having a thickness of 30 µm to 150 µm and at least a core layer laminated on the first clad layer;
    forming a light propagating optical waveguide core by cutting through the core layer by use of a dicing saw from a side where the core layer is laminated while intruding an edge of a blade portion of the dicing saw into the first clad layer so as to partially cut the first clad layer, an incising amount of the blade portion of the dicing saw into the first clad layer being 10 µm or more, a cutting residue amount of the first clad layer being 10 µm or more, and a deformation portion of a cross-sectional shape of a cut groove due to wear of the edge of the blade portion of the dicing saw being formed in the first clad layer; and
    embedding at least a cut portion of the laminated body with a material of a second clad layer,
    wherein the edge of the blade portion of the dicing saw is non-flat,
    wherein a cross-sectional shape of the edge of the blade portion of the dicing saw is non-flat when viewed along a main cutting direction of the blade portion,
    wherein the blade portion is configured such that the resulting cut portion has a cross-sectional shape when viewed along the main cutting direction of the blade portion,
    wherein the cross-sectional shape of the cut portion comprises:
        an upper side portion and a lower side portion both of which are defined by a peripheral side surface of the cut portion; and
        a bottommost portion defined by a bottommost surface of the cut portion,
    wherein the upper side portion defines a first approximate line,
    wherein the bottommost portion defines a second approximate line,
    wherein the lower side portion starts deviating from the first approximate line starting at a deviating point, and
    wherein a length R, measured in a depth direction of the cut portion, between said deviating point and said second approximate line is 10 µm or more.

2. The production method of an optical waveguide according to claim 1, wherein the embedding at least the cut portion of the laminated body with the material of the second clad layer comprises filling a curable resin in the cut portion of the laminated body and curing the curable resin.

3. The production method of an optical waveguide according to claim 2, wherein the curable resin is a UV-curable resin.

4. The production method of an optical waveguide according to claim 1, wherein the laminated body comprises an alicyclic olefin film, an acrylic film, an epoxy film, or a polyimide film.

5. A production method of an optical waveguide, comprising:
    preparing a laminated body that comprises a first clad layer having a thickness of 30 µm to 150 µm and, on the first clad layer, at least a core layer and a third clad layer laminated in this order;
    forming a light propagating optical waveguide core by cutting through the core layer and the third clad layer by use of a dicing saw from a side where the core layer and the third clad layer are laminated while intruding an edge of a blade portion of the dicing saw into the first clad layer so as to partially cut the first clad layer, an incising amount of the blade portion of the dicing saw into the first clad layer being 10 µm or more, a cutting residue amount of the first clad layer being 10 µm or more, and a deformation portion of a cross-sectional shape of a cut groove due to wear of the edge of the blade portion of the dicing saw being formed in the first clad layer; and
    embedding at least a cut portion of the laminated body with a material of a second clad layer, wherein the edge of the blade portion of the dicing saw is non-flat, wherein a cross-sectional shape of the edge of the blade portion of the dicing saw is non-flat when viewed along a main cutting direction of the blade portion, wherein the blade portion is configured such that the resulting cut portion has a cross-sectional shape when viewed along the main cutting direction of the blade portion, wherein the cross-sectional shape of the cut portion comprises:

an upper side portion and a lower side portion both of which are defined by a peripheral side surface of the cut portion; and a bottommost portion defined by a bottommost surface of the cut portion, wherein the upper side portion defines a first approximate line, wherein the bottommost portion defines a second approximate line, wherein the lower side portion starts deviating from the first approximate line starting at a deviating point, and wherein a length R, measured in a depth direction of the cut portion, between said deviating point and said second approximate line is 10 µm or more.

6. The production method of an optical waveguide according to claim 5, wherein the embedding at least the cut portion of the laminated body with the material of the second clad layer comprises filling a curable resin in the cut portion of the laminated body and curing the curable resin.

7. The production method of an optical waveguide according to claim 6, wherein the curable resin is a UV-curable resin.

8. The production method of an optical waveguide according to claim 5, wherein the laminated body comprises an alicyclic olefin film, an acrylic film, an epoxy film, or a polyimide film.

9. The production method of an optical waveguide according to claim 1, wherein the edge of the blade portion of the dicing saw is intruded into the first clad layer at an angle of about 90° relative to a topmost surface of the first clad layer.

10. The production method of an optical waveguide according to claim 1, wherein the first clad layer is partially cut along a direction that is substantially parallel to an optical axis of the optical waveguide core.

11. The production method of an optical waveguide according to claim 1, wherein the intruding the edge of the blade portion of the dicing saw into the first clad layer so as to partially cut the first clad layer is performed without cutting across an optical axis of the optical waveguide core.

* * * * *